United States Patent
Winter

(10) Patent No.: US 8,617,020 B2
(45) Date of Patent: Dec. 31, 2013

(54) CONTINUOUSLY VARIABLE TRANSMISSION

(75) Inventor: Philip Duncan Winter, Lancashire (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 795 days.

(21) Appl. No.: 12/528,081

(22) PCT Filed: Feb. 7, 2008

(86) PCT No.: PCT/GB2008/050075
§ 371 (c)(1),
(2), (4) Date: Jan. 19, 2010

(87) PCT Pub. No.: WO2008/102167
PCT Pub. Date: Aug. 28, 2008

(65) Prior Publication Data
US 2010/0144482 A1   Jun. 10, 2010

(30) Foreign Application Priority Data
Feb. 21, 2007   (GB) .................................. 0703351.7

(51) Int. Cl.
*F16H 37/02*   (2006.01)
(52) U.S. Cl.
USPC ............................ 475/217; 475/214; 475/216
(58) Field of Classification Search
USPC ......................................... 475/210–219, 302
See application file for complete search history.

(56) References Cited

U.S. PATENT DOCUMENTS

| 4,662,240 A | 5/1987 | Greenwood |
| 4,768,398 A * | 9/1988 | Greenwood ................. 475/216 |

(Continued)

FOREIGN PATENT DOCUMENTS

| DE | 43 27 435 A1 | 3/1994 |
| DE | 101 25 817 | 11/2002 |

(Continued)

OTHER PUBLICATIONS

PCT International Search Report for PCT Counterpart Application No. PCT/GB2008/050075 containing Communication relating to the Results of the Partial International Search Report, 3 pgs., (Jul. 22, 2008).

(Continued)

*Primary Examiner* — Tisha Lewis
(74) *Attorney, Agent, or Firm* — Blakely, Sokoloff, Taylor & Zafman LLP

(57) ABSTRACT

A continuously variable transmission having a transmission input (60) and a transmission output (114) is described. The transmission has a variator (56). This is a device which transmits drive at steplessly variable ratio. It further comprises an epicyclic gear arrangement (58) incorporating a clutch arrangement (152). The epicyclic gear arrangement has three rotary members. One of these is coupled to a planet carrier (86) having at least one planet gear (94). Another of the rotary members is coupled to a main gear (90) meshing with the planet gear. The clutching arrangement serves to couple the remaining rotary member to either of first and second alternative gears (96, 98), both of which mesh with the planet gear and which rotate at different speeds. One of the aforesaid rotary members is coupled to the transmission input at a fixed drive ratio. One of them is coupled to the variator output. The last of the rotary members is coupled to the transmission output. By way of the clutching arrangement the transmission can be changed between first and second ratio ranges.

3 Claims, 3 Drawing Sheets

(56) References Cited

U.S. PATENT DOCUMENTS

| | | | |
|---|---|---|---|
| 4,836,050 A | | 6/1989 | Numazawa et al. |
| 5,564,998 A | | 10/1996 | Fellows |
| 5,643,121 A | | 7/1997 | Greenwood et al. |
| 5,720,687 A | * | 2/1998 | Bennett ............................ 475/214 |
| 6,251,039 B1 | * | 6/2001 | Koga ............................. 475/216 |
| 6,358,178 B1 | * | 3/2002 | Wittkopp ........................ 475/207 |
| 8,142,323 B2 | * | 3/2012 | Tsuchiya et al. ............... 475/216 |
| 8,393,990 B2 | | 3/2013 | Greenwood et al. |
| 2002/0045511 A1 | | 4/2002 | Geiberger et al. |
| 2002/0098936 A1 | | 7/2002 | Haka |
| 2004/0033858 A1 | | 2/2004 | Sumi |
| 2006/0189432 A1 | | 8/2006 | Tsuchiya et al. |
| 2010/0282020 A1 | * | 11/2010 | Greenwood et al. .......... 74/665 F |
| 2012/0142477 A1 | * | 6/2012 | Winter ............................ 475/192 |

FOREIGN PATENT DOCUMENTS

| | | |
|---|---|---|
| DE | 10205752 A1 | 2/2003 |
| EP | 0 185 463 A1 | 6/1986 |
| EP | 1 369 624 | 12/2003 |
| EP | 1 696 152 | 8/2006 |
| GB | 2 100 372 A | 12/1982 |
| GB | 2 384 835 | 8/2003 |
| GB | 2 408 853 A | 5/2005 |
| GB | 2 418 235 A | 3/2006 |
| JP | 2006-234041 | 9/2006 |
| RU | 93045080 A | 2/1996 |
| SU | 171234 A | 5/1965 |
| WO | WO 03/100295 A1 | 12/2003 |
| WO | WO 2004/008001 A1 | 1/2004 |
| WO | WO 2005/003597 A1 | 1/2005 |
| WO | WO 2005/108825 A1 | 11/2005 |
| WO | WO 2006/103294 A1 | 10/2006 |

OTHER PUBLICATIONS

GB Application No. GB 0202346.3, Patents Act 1977: Search Report Under Section 17, Date of Search May 28, 2002, 1 page.

GB Application No. GB0420865.8, Patents Act 1977: Search Report Under Section 17, Date of Search Nov. 29, 2004, 1 page.

PCT International Preliminary Report on Patentability for PCT Application No. PCT/G82008/050075, 8 pgs. (Aug. 26, 2009).

Written Opinion of the International Search Authority for PCT Counterpart Application No. PCT/GB2008/050075, 7 pgs, (Aug. 21, 2009).

Patents Act 1977: Search Report under Section 17(5) for United Kingdom Counterpart Application No. GB 0703351.7, 4 pgs. (Jun. 8, 2007).

Decision on Grant for Russian Counterpart Application NO. 2009134990/11 with English translation, 6 pgs. (Feb. 4, 2013).

* cited by examiner

CONTINUOUSLY VARIABLE TRANSMISSION

CROSS-REFERENCE TO RELATED APPLICATIONS

This patent application is a U.S. National Phase application under 35 U.S.C. §371 of International Application No. PCT/GB2008/050075, filed on Feb. 7, 2008, entitled CONTINUOUSLY VARIABLE TRANSMISSION, which claims priority to Great Britain patent application number 0703351.7, filed Feb. 21, 2007.

FIELD

The present invention is concerned with continuously variable transmissions ("CVTs") and more particularly with CVTs which utilise epicyclic shunt gearing.

BACKGROUND

One such CVT, well known to those skilled in the art, is represented in highly schematic form in FIG. 1. An engine 10 drives a transmission input shaft 12. A transmission output shaft 14 is coupled to wheels 16 of a motor vehicle. Stepless variation of transmission ratio is provided by means of a variator 18. The word "variator" will be used herein to refer to a device which transfers drive between a first rotary member (such as variator input shaft 20) and a second rotary member (such as output shaft 22) at a steplessly variable speed ratio. The transmission also has an epicyclic shunt gear train 24 (whose construction is not shown in this drawing) having three shafts. The shunt's first shaft 26 is operatively coupled to the engine 10, e.g. through fixed ratio gearing. The shunt's shaft 28 is coupled to the output shaft 22 of the variator 18. The third shaft 30 rotates at a speed which is a function of the speeds of the first and second shafts, and is coupled to the transmission output shaft 14.

A transmission of this type can provide an infinite speed reduction, referred to in the art as "geared neutral". At some variator ratio, the speeds of the first and second rotary shafts 26, 28 of the shunt 24 cancel each other out, leaving the third shaft 30—and the transmission output—stationary, despite the fact that the output is not physically de-coupled from the moving engine. Typically gear ratios in the transmission are chosen such that merely by changing the variator a to the speed ratio provided by the transmission as a whole can be varied through a range of reverse and forward gears including geared neutral.

Power is recirculated through the variator 18 by the shunt 24, in a direction against the flow of power from engine to wheels (or vice versa, during engine braking). This power recirculation reduces the total power flow through the variator, which is thus required to transmit only part of the total power transmitted by the transmission. The variator is typically the least energy efficient part of the transmission. Hence it is desirable to minimise power flow through it.

Now, in some motor vehicles having a conventional stepped ratio main gearbox, a secondary gearbox is provided between the main gearbox and the wheels. Tractors often have this type of arrangement. For low speed operations such as ploughing, the secondary gearbox is placed in a low ratio. When higher speeds are needed, e.g. when driving on a road, the secondary gearbox is placed in a high ratio. A secondary gearbox can likewise be used with a CVT. In FIG. 1 such a gearbox is indicated in phantom at 32, and is switchable between low and high ranges.

Optimising efficiency of such a CVT presents a problem. Suppose that the low range is intended to provide vehicle speeds from 15 kph reverse to 15 kph forwards, and that the high range is intended to provide a forward speed up to 40 kph. Clearly this can be achieved by choice of suitable ratios for the secondary gearbox 32, in the type of arrangement seen in FIG. 1. In high range, the transmission would then be capable of providing vehicle speeds from 40 kph forwards to 40 kph in reverse. Such a high reverse speed is not however required for most applications, and transmission efficiency with such a system would be less than optimal. The proportion of total power handled by the variator increases with increasing transmission ratio range. Hence in the FIG. 1 transmission, and in high range, an unnecessarily large proportion of power is handled by the variator, impairing transmission efficiency.

SUMMARY

In accordance with the present invention there is a continuously variable transmission comprising a transmission input, a transmission output, a variator which is adapted to transfer drive between a variator input and a variator output at a continuously variable variator ratio, and an epicyclic gear arrangement incorporating a clutching arrangement, the epicyclic gear arrangement having three rotary members, one of the rotary members being coupled to a planet carrier carrying at least one planet gear, one of the rotary members being coupled to a main gear meshing with the planet gear, and the clutching arrangement being arranged to couple the remaining rotary member to either of first and second alternative gears, both of which mesh with the planet gear and which rotate at different speeds, one of the rotary members being coupled to the transmission input at a fixed drive ratio, one of the rotary members being coupled to the variator output, and one of the rotary members being coupled to the transmission output, so that by means of the clutching arrangement the transmission can be changed between first and second ratio ranges.

The rotary members may for example take the form of shafts, but their function is to transfer rotary drive to/from the relevant parts of the epicyclic gear and any component capable of doing this may be used. For example in the transmissions to be described below the variator output disc is directly connected to the planet carrier through rods or axles, and these form the corresponding rotary member. Where "coupling" is referred to, it implies that there is a route for transfer of drive between the specified parts, and this may be through a direct physical connection of one to the other, or may be through gearing or some other suitable mechanism such as a chain drive.

BRIEF DESCRIPTION OF THE DRAWINGS

Specific embodiments of the present invention will now be described, by way of example only, with reference to the accompanying drawings, in which:—

DETAILED DESCRIPTION

Figure 3:
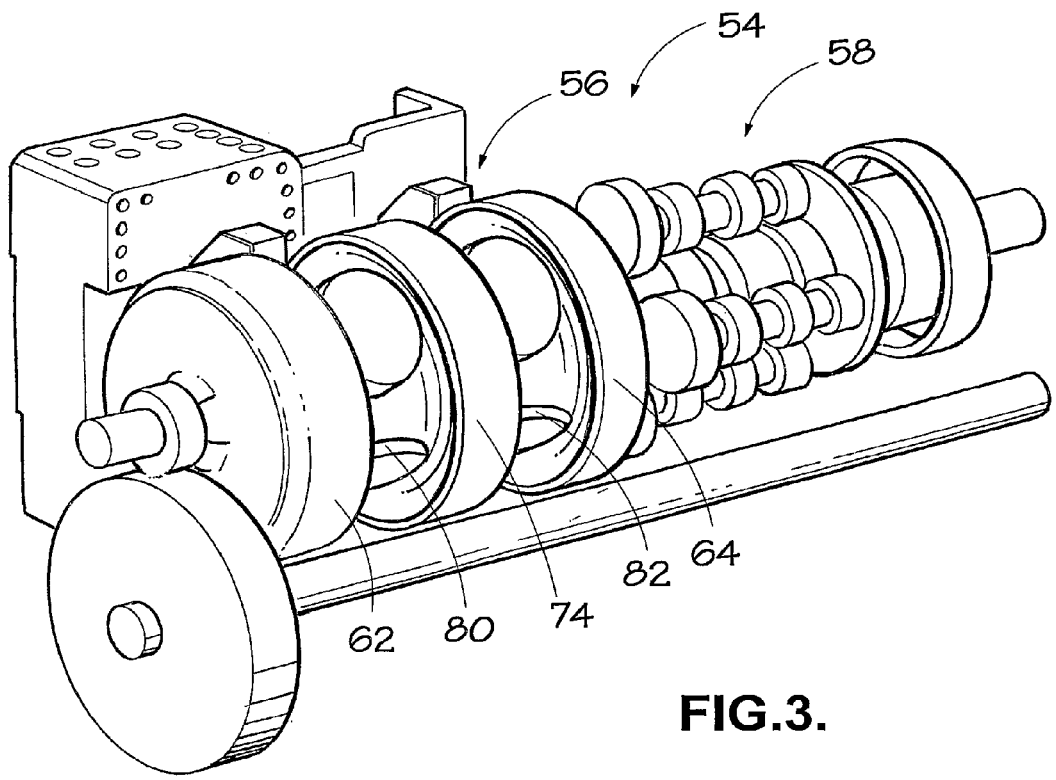
FIG. 3 is a perspective illustration of the transmission seen in FIG. 2.
Figure 2:
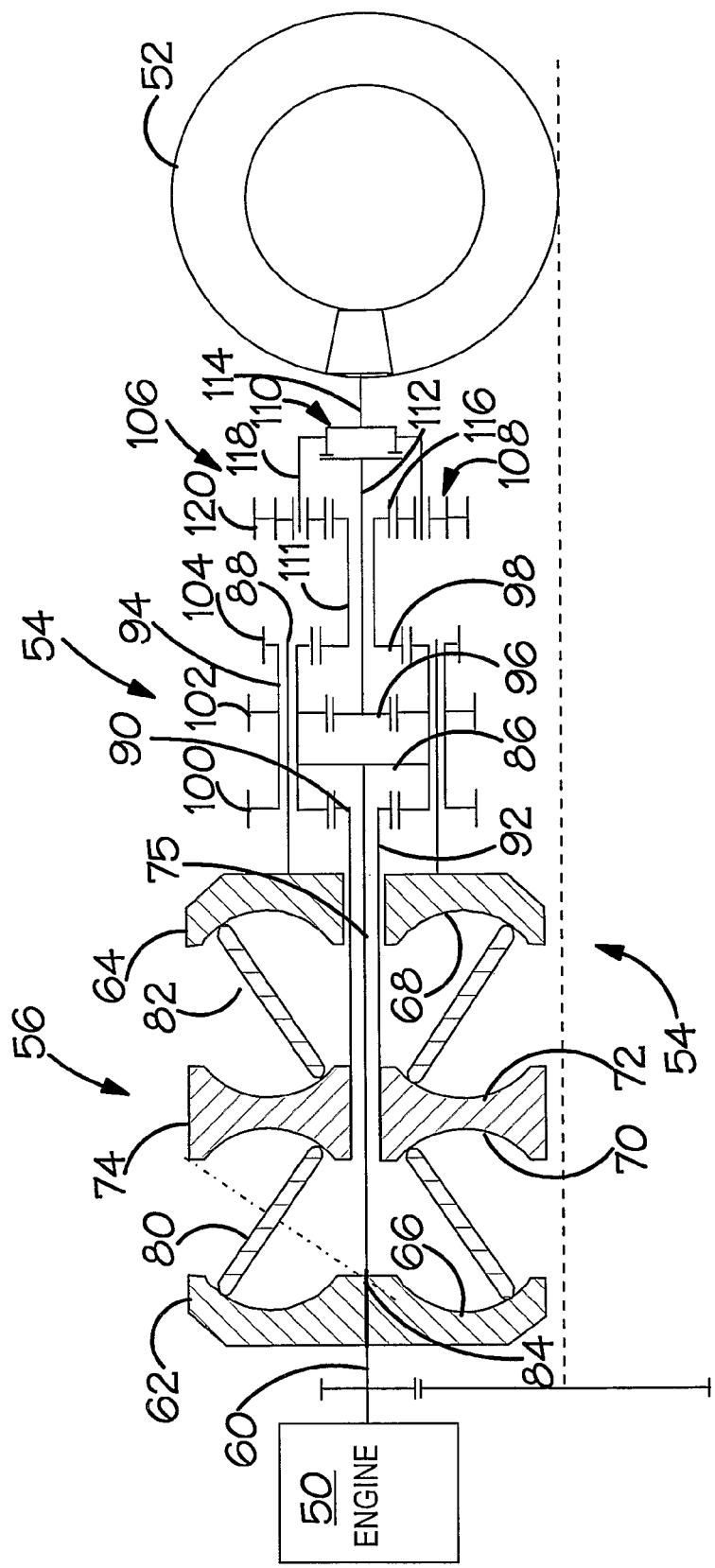
FIG. 2 is a simplified representation of a transmission embodying the present invention.

In the transmission illustrated in FIGS. 2 and 3 an engine 50 is coupled to vehicle wheels 52 through a CVT 54 comprising a variator 56 and an epicyclic shunt 58.

The engine 50 may be an internal combustion engine. The illustrated transmission is particularly well suited to use with speed governed diesel engines, commonly found for example in agricultural vehicles such as tractors and in vehicles used in the construction industry. In a vehicle having this combination of engine and transmission, the driver can set a chosen engine speed and then exercise control over vehicle speed by adjustment of variator ratio. In low regime at least, the driver can in this way select from a continuous range of forward and reverse speeds, and can bring the vehicle to a halt by selection of geared neutral. Note however that CVTs according to the present invention are not solely suited to use with speed governed engines, and may be used with any suitable rotary drivers, such as electric motors, external combustion engines etc. A shaft 60 couples the engine to the variator input, and forms the transmission's input shaft. Of course gearing could in practice be interposed between the engine and the variator.

The variator 56 is in the illustrated example of toroidal race rolling traction type. More specifically, it is of the type known in the art as "full toroidal". Such variators are well known and will be described only briefly herein. The invention may be implemented using variators of other types including (but not limited to) belt and sheave variators and hydrostatic variators.

The illustrated variator 56 has first and second input races 62, 64 between which is a single output race 74. The input races 62, 64 have respective semi-toroidally recessed raceways 66, 68 facing toward similarly shaped raceways 70, 72 formed on opposite sides of the output race 74. The input and output races 62, 64, 74 are mounted for rotation about a common axis defined by a shaft 75, which in this example is simply an extension of the transmission input shaft 60. The input and output races together define two generally toroidal cavities 76, 78, each of which contains a respective set of rollers 80, 82. The rollers run upon the raceways and so transfer drive between the outer aces 62, 64 (which are coupled to rotate together) and the inner race 74. The rollers are each mounted for rotation about their own axes, one of which is indicated at 84, and is seen in the drawing to be inclined to the shaft 75. The angle of inclination of the rollers is variable and corresponds to the variator drive ratio. Changing roller inclination changes the circumferences of the paths traced by the rollers upon the races, and thus changes the ratio of the speed of the inner race relative to the speed of the outer races—i.e. it changes the variator drive ratio.

The input side of the variator 56 is driven at fixed ratio from the engine 50 (it should be noted that while it is convenient to refer to the case where the transmission and wheels are driven by the engine, power flow can of course be in the other direction in an "over-run" or "engine braking" condition). In the illustrated embodiment, the engine drives the shaft 60, 75 and the first input race 62 is mounted upon the shaft 75 to rotate along with it. The shaft 75 extends through all of the races and projects outboard of the second input race 64, where it carries a planet carrier 86. The planet carrier is coupled through axles 88 to the second input race's outer surface, so that the second input race 64 must rotate along with the shaft 75.

The output side of the variator is coupled to a main gear 90. In the illustrated embodiment, this coupling is made via a sleeve 92 which is coaxial with and disposed around the shaft 75, and which extends from the output race 74 through the second input race 64 to the region outboard of the second input ace. A bearing between the second input race 64 and the sleeve 92 allows one to rotate relative to the other. The axles 88 of the planet carrier 86 carry planet gears 94 which mesh with the main gear 90. The planet gears 94 are able both to spin about their own axes and to move in a circular orbit about the axis of the epicyclic gearing.

The planet gears additionally mesh with first and second alternative output gears 96, 98. In the FIG. 2 embodiment, the planet gears are seen to have three separate toothed gear heads 100, 102, 104 meshing respectively with the main gear 90 and with the first and second output gears 96, 98. This construction allows the numbers of teeth through which the planet gears 94 engage with the other gears to be individually chosen to provide required ratios, although in other embodiments the planets gears might each have a single set of gear teeth meshing with all three of the associated gears 90, 96, 98. Also the planet gears 94 could in practice be formed as multiple coupled components, e.g. for the sake of convenience in manufacture or assembly. The two output gears 96, 98 are driven at different speeds by the planet gears 94. In the illustrated embodiment, this is because the first output gear 96 is smaller than the second output gear 98, and the gear head 102 with which it meshes is correspondingly larger than its counterpart gear head 104. Both output gears are driven by the planet gears 94 at any one time, and one or the other is normally coupled to the transmission's output and hence to the vehicle wheels 52 by a clutching arrangement 106.

In FIGS. 2 and 3 the clutching arrangement itself uses an output epicyclic gear arrangement 108, in order that the arrangement can be co-axial with the shaft 75. The first output gear 96 is coupled to one part of a clutch 110 through a shaft 112. Another part of the clutch 110 is coupled to a transmission output shaft 114. In one of its states, the clutch thus couples the first output gear 96 to the transmission output 114. A sleeve 111 lying around the shaft 112 serves to couple the second output gear 98 to a sun gear 116 of the epicyclic 108 whose planet carrier 118 is coupled to a further part of the clutch 110. The output epicyclic also has a fixed annular gear 120. In another of its states, the clutch thus serves to couple the transmission output 114 through the output epicyclic 108 to the second output gear 98. Switching the clutch state thus changes between high and low ranges.

Figure 1:
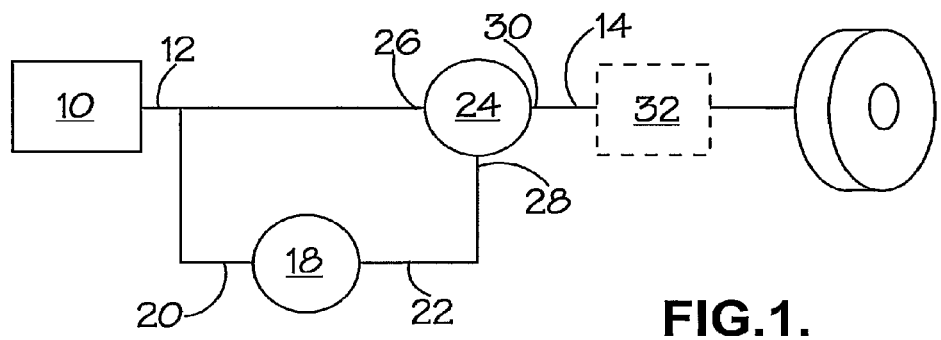
FIG. 1 is a schematic representation of a CVT of power recirculatory type.

It is important to appreciate that the embodiment illustrated in FIGS. 2 and 3 is not functionally equivalent to the transmission seen in FIG. 1. Both are able to provide high and low ratio ranges. However the secondary gearbox 32 of FIG. 1 can only multiply the speed output from its epicyclic gear train 24 by some factor (the factor of course being different in the two ranges). Thus as suggested above low range might provide vehicle speeds from 15 kph reverse to 15 kph forwards, and high range speeds from 40 kph reverse to 40 kph forwards. The proportion of the total range on either side of geared neutral cannot be altered between low and high ranges. The same limitation does not apply to the transmission of FIGS. 2 and 3. Thus for example gear ratios could be chosen to provide speeds from −15 kph to +15 kph in the low range, and from −15 kph to +40 kph in high range. Because the total ratio spread in the high range is smaller, while still providing the required maximum forward speed, the proportion of the total transmitted power routed through the variator can be smaller and as a result the transmission can be more efficient.

Figure 4:
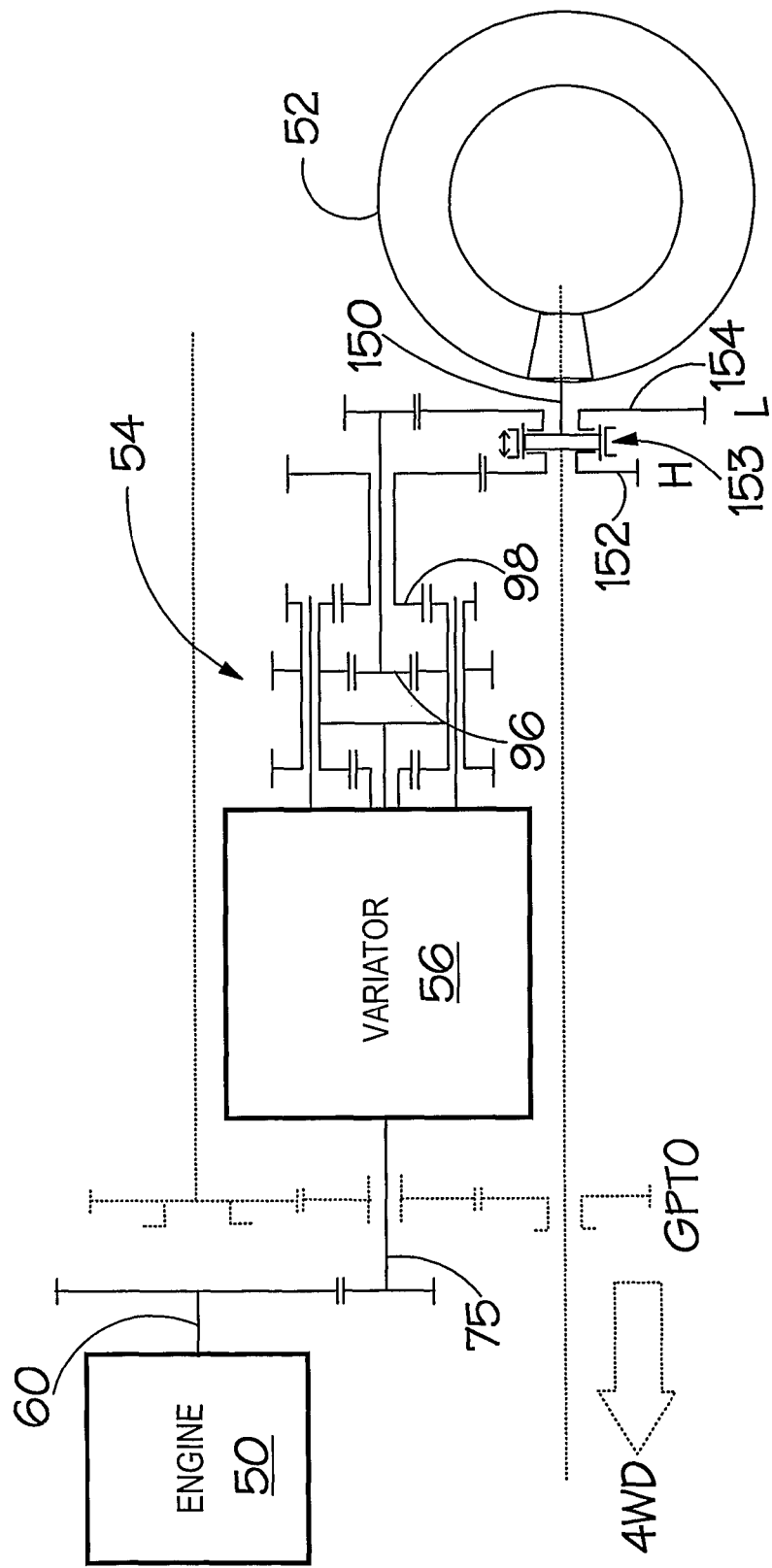
FIG. 4 is a simplified representation of a second transmission embodying the present invention.

The transmission illustrated in FIG. 4 is in many respects similar to that shown in FIGS. 2 and 3, and corresponding parts are given the same reference numerals (although only the principal parts have been labelled in this way), but in place of the output epicyclic 108 the FIG. 4 version has an arrangement using a layshaft 150 offset from the shaft 75. Layshaft gears 152, 154 mesh respectively with gear heads of the two output gears 96, 98 and are co-axial with the layshaft, but able to rotate about it. Clutch 152 serves to selectively couple one or other of the layshaft gears 152, 154 to the layshaft, and so to transmit that gear's rotation to the wheels 52.

Numerous possible developments and modifications to the illustrated embodiments are possible without departing from the scope of the present invention. For example, epicyclic gearing commonly has an internally toothed annular gear outside the planet gears, and such an arrangement could be adopted in transmissions embodying the present invention, e.g. using two separate annular gears engaging with respective toothed gear heads on the planet gears, in place of the output gears 96, 98.

What is claimed is:

1. A continuously variable transmission comprising:
   a transmission input,
   a transmission output,
   a variator which is adapted to transfer drive between a variator input and a variator output at a continuously variable variator ratio, and
   an epicyclic gear arrangement incorporating a clutching arrangement, the epicyclic gear arrangement having three rotary members, one of the rotary members being coupled to a planet carrier carrying at least one planet gear, one of the rotary members being coupled to a main gear meshing with the planet gear, and the clutching arrangement being arranged to couple the remaining rotary member to either of first and second alternative gears, both of which mesh with the planet gear and which rotate at different speeds, one of the rotary members being coupled to the transmission input at a fixed drive ratio, one of the rotary members being coupled to the variator output, and one of the rotary members being coupled to the transmission output, so that by means of the clutching arrangement the transmission can be changed between first and second ratio ranges, wherein gearing of the continuously variable transmission is such that there is a first variator ratio which, whilst the transmission is in the first range, causes the transmission output to be stationary, and there is a second variator ratio which, whilst the transmission is in the second range, causes the transmission output to be stationary, the first variator ratio being different from the second variator ratio.

2. The continuously variable transmission as claimed in claim 1 in which the variator output is coupled to the main gear.

3. The continuously variable transmission as claimed in claim 2 in which the variator input is coupled to the transmission input.

* * * * *